United States Patent [19]

Weber et al.

[11] Patent Number: 5,164,353

[45] Date of Patent: Nov. 17, 1992

[54] SUPPORTED CHROMIUM OXIDE CATALYST

[75] Inventors: Siegfried Weber, Weinheim; Guido Funk, Worms, both of Fed. Rep. of Germany

[73] Assignee: BASF Aktiengesellschaft, Ludwigshafen, Fed. Rep. of Germany

[21] Appl. No.: 435,681

[22] Filed: Nov. 14, 1989

[30] Foreign Application Priority Data

Dec. 9, 1988 [DE] Fed. Rep. of Germany ....... 3841436

[51] Int. Cl.$^5$ .................... B01J 21/8; B01J 23/26; B01J 27/188; C08F 4/12; C08F 4/18; C08F 4/24
[52] U.S. Cl. .................... 502/210; 502/256; 502/320; 526/100; 526/106; 526/101; 526/129; 526/156
[58] Field of Search ............ 526/106, 100, 101, 129, 526/156; 502/210, 256, 320

[56] References Cited

U.S. PATENT DOCUMENTS

| | | | |
|---|---|---|---|
| 3,242,150 | 3/1966 | Scoggin | |
| 4,007,321 | 2/1977 | Scholz et al. | |
| 4,146,695 | 3/1979 | Van de Leemput | 526/106 |
| 4,496,699 | 1/1985 | Rekers et al. | 526/106 |
| 4,547,479 | 10/1985 | Johnson et al. | 526/106 |
| 4,640,964 | 2/1987 | Johnson et al. | 526/106 |

FOREIGN PATENT DOCUMENTS 841263 7/1960 United Kingdom.
1435965 5/1976 United Kingdom.

Primary Examiner—Joseph L. Schofer
Assistant Examiner—Tom Weber
Attorney, Agent, or Firm—Keil & Weinkauf

[57] ABSTRACT

A supported catalyst for ethene polymerization by Phillips catalysis is disclosed. The supported catalyst is prepared by (1) mixing a porous silicate in an inert, organic liquid to produce a silicate suspension, (2) providing an ester of phosphoric acid or phosphorous acid, (3) mixing an organic liquid, a chromium compound, and a trialkylaluminum compound to produce a chromium compound/aluminum compound and combining the silicate suspension, the phosphorus compound and the chromium compound/aluminum compound suspension. This resulting suspension is evaporated to dryness to form a catalyst intermediate. The catalyst intermediate is heated in nitrogen, then heated in an oxygen-containing atmosphere, and then heated again in nitrogen to produce an activated catalyst. The activated catalyst is suspended in an organic liquid and treated with an alkyl boron compound to produce the desired supported catalyst.

1 Claim, No Drawings

SUPPORTED CHROMIUM OXIDE CATALYST

The present invention relates to a process for the preparation of ethene homopolymers and ethene copolymers with minor amounts of copolymerized $C_3$–$C_{12}$-α-monoalkenes, in particular $C_3$–$C_8$-α-monoalkenes, by polymerization of the monomer or monomers at from 30° to 150° C., in particular from 60° to 120° C., and under from 2 to 150, in particular from 5 to 60, bar by Phillips catalysis using:

(1) a supported catalyst consisting of a carrier which is laden with chromium in oxide form, phosphorus in oxide form and aluminum in oxide form and (2) a cocatalyst, the supported catalyst (1) being obtained by a method in which:

a catalyst intermediate laden with the desired amounts of chromium, phosphorus and aluminum is prepared from a finely divided, porous silicate carrier,
a selected, specific chromium compound,
a selected, specific phosphorus compound and
a selected, specific aluminum compound, and then the catalyst intermediate (1.1) thus obtained is maintained in an anhydrous gas stream containing oxygen in the concentration of more than 10% by volume for from 10 to 1,000, in particular from 60 to 300, minutes at from 300° to 900° C., in particular from 500° to 800° C. (ie. calcined or activated) and the catalyst intermediate activated in this manner is reacted with a selected alkylboron to give the actual supported catalyst (1).

Polymerization processes of this type are known, and that described in EP-A-264 895 may be regarded as typical in the present context.

A significant feature of this process is that supported catalysts are used which are obtained by charging a silicate carrier with selected chromium, phosphorus and aluminum compounds. The intermediates thus obtained are subjected to a heat treatment, ie. calcination, and the solid catalysts obtained are used with the two cocatalysts alkyllithium and alkylboron in the polymerization.

Although the polymerization process discussed above gives, with satisfactory productivity, polymers having a variable molecular weight distribution and a high melt flow index, the product morphology is unsatisfactory, ie. the amount of fine dust in the polymer is very large.

It is an object of the present invention to develop a process of the type defined at the outset in such a way that it has the disadvantage described above to a considerably reduced extent, if at all, and retains the advantageous properties of the process described in EP-A-264 895.

We have found that this object is achieved if, in the polymerization process under discussion, (1) a supported catalyst is used which has been obtained by a method in which a suspension is first prepared from a finely divided silicate carrier and an inert organic solvent, then in an inert organic solvent a chromium compound of the formula $Cr^{3+}(RCO-CR^1-COR)_3^-$, where R is alkyl and $R^1$ is alkyl or hydrogen, is combined with an aluminum compound of the formula $AlR^2_3$, where $R^2$ is alkyl. Then the silicate suspension is combined with a phosphorus compound of the formula $P(O)(OR^3)_3$ or $P(O)H(OR^3)_2$, where $R^3$ is alkyl, aryl or cycloalkyl or hydrogen, such that one or more groups R are not hydrogen, and the chromium compound/aluminum compound suspension.

and finally, the suspension obtained is evaporated to dryness to obtain a catalyst intermediate. The catalyst intermediate thus obtained is treated with a stream of nitrogen, then is heated in an oxygen-containing gas stream, and finally the intermediate is treated with a stream of nitrogen to obtain a catalyst intermediate. The catalyst intermediate thus obtained is reacted with a boron compound of the formula $BR^4_3$, where $R^4$ is alkyl, in an inert solvent, and (2) an alkyllithium is used as the cocatalyst.

The present invention accordingly relates to a process for the preparation of ethene homopolymers and ethene copolymers with minor amounts of copolymerized $C_3$–$C_{12}$-α-monoalkenes, in particular $C_3$–$C_8$-α-monoalkenes, by polymerization of the monomer or monomers at from 30° to 150° C., in particular from 60° to 120° C., and under from 2 to 150, in particular from 5 to 60, bar by Phillips catalysis using (1) a supported catalyst consisting of a carrier which is laden with chromium in oxide form, phosphorus in oxide form and aluminum in oxide form and then reacted with an alkylboron, and (2) a cocatalyst., The supported catalyst (1) is obtained by a method in which a catalyst intermediate laden with the desired amounts of chromium, phosphorus and aluminum is prepared from a finely divided, porous, silicate carrier, a selected, specific chromium compound, a selected, specific phosphorus compound and a selected, specific aluminum compound to prepare a catalyst intermediate The catalyst intermediate thus obtained is maintained in an anhydrous gas stream containing oxygen in a concentration of more than 10% by volume for from 10 to 1,000, in particular from 60 to 300, minutes at from 300° to 900° C., in particular from 500° to 800° C. (ie. calcined or to obtain an activated catalyst intermediate.

The activated catalyst intermediate is reacted with a selected alkylboron to give the actual supported catalyst (1).

In the novel process, (1) a supported catalyst is used which has been obtained by a method in which a catalyst intermediate is prepared by a procedure in which:

a suspension is prepared from a finely divided, porous, silicate carrier which has a particle diameter of from 1 to 400 μm, preferably from 10 to 200 μm, a pore volume of from 0.5 to 3, preferably from 1 to 2.5, cm³/g and a specific surface area of 1,000, preferably from 200 to 700, m²/g, and an inert organic solvent, preferably a liquid aliphatic, cycloaliphatic or aromatic hydrocarbon, in particular a $C_5$–$C_7$-alkane, with thorough mixing, such that there are from 150 to 5,000, preferably from 200 to 1,000, parts by weight of the solvent per 100 parts by weight of the carrier in a solvent of the type just defined a chromium compound of the formula

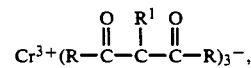

where

R is alkyl of not more than 12, preferably not more than 4, carbon atoms, in particular methyl, and $R^1$ is alkyl of not more than 12, preferably not more than 4, carbon atoms or, in particular, hydrogen is combined with an aluminum compound of the formula $AlR^2_3$, where $R^2$ is alkyl of not more than 12, preferably 2 to 4, carbon atoms, in particular isobutyl, with thorough mixing at from 0° to 100° C., preferably from 20° to 50° C., such that there are from 0.5 to 10, preferably from 1 to 3, parts by weight of aluminum from the aluminum compound and from 5 to 500, preferably from 50 to 300, parts by weight of solvent per part by weight of chromium from the chromium compound and the entire mixture is kept for from 5 to 300, preferably from 20 to 60, minutes at the stated temperature;, the silicate suspension is combined with a phosphorus compound of the formula $P(O)(OR^3)_3$ or $P(O)H(OR^3)_2$, where $R^3$ is alkyl, aryl or cycloalkyl of not more than 12, preferably not more than 6, carbon atoms or hydrogen, in particular $C_2$–$C_4$-alkyl or hydrogen, such that one or more groups R are not hydrogen and the chromium compound/aluminum compound is added with thorough mixing at from 0° to 60° C., preferably from 10° to 30° C., such that there are from 0.1 to 5, preferably from 0.5 to 2, parts by weight of chromium from the chromium compound and from 0.5 to 10, preferably from 1 to 3, % by weight of phosphorus from the phosphorus compound per 100 parts by weight of the carrier, and the entire mixture is kept at from 5 to 300, preferably from 20 to 60, minutes at the stated temperature;, the suspension thus obtained is evaporated to dryness at not more than 150° C., preferably not more than 80° C., under atmospheric or reduced pressure, to obtain an intermediate, the intermediate thus obtained is converted into the catalyst intermediate by a method in which first the catalyst intermediate is kept in an anhydrous stream of nitrogen for from 60 to 500, in particular from 100 to 300, minutes at from 150° to 300° C., in particular from 200° to 270° C.

the intermediate is kept in an anhydrous gas stream containing oxygen in a concentration of more than 10% by volume for from 10 to 1,000, in particular from 60 to 300, minutes at from 300° to 900° C., in particular from 500° to 800° C.

the intermediate is kept in an anhydrous stream of nitrogen for from 10 to 300, in particular from 30 to 150, minutes at from 50° to 400° C., in particular from 100° to 270° C., to obtain an activated catalyst intermediate, the activated catalyst intermediate is suspended in an inert solvent, preferably an aliphatic $C_3$–$C_{12}$-hydrocarbon; and the suspension thus obtained is reacted with an alkylboron of the formula $BR^4_3$, where $R^4$ is $C_1$–$C_{12}$-alkyl, in particular $C_2$–$C_4$-alkyl, the atomic ratio of chromium in catalyst intermediate (1.2) to boron being from 1:0.01 to 1:1, preferably from 1:0.1 to 1:1, at from −40° to 100° C.

An alkyllithium of the formula $LiR^5$, where $R^5$ is $C_1$–$C_{12}$-alkyl, in particular $C_2$–$C_4$-alkyl, is used as the cocatalyst, the atomic ratio of chromium in the supported catalyst to Li in the cocatalyst being greater than 1:100, in particular from 1:1 to 1:20.

Regarding the novel polymerization process in all its aspects, the following may be stated:

Provided that the special feature according to the invention is taken into account, the polymerization process as such can be carried out in virtually all relevant conventional technological embodiments, for example as a batchwise, cyclic or continuous suspension polymerization process or dry phase polymerization process in a stirred or fluidized bed. The stated technological embodiments, ie. the technological variants of the polymerization of olefins by the Phillips method, are well known from the literature and in practice, so that further explanations are unnecessary.

It should however, be emphasized that the novel procedure is preferably carried out by a process for the continuous preparation of particulate homopolymers or copolymers by polymerization of the monomer or monomers in a liquid $C_4$–$C_5$-alkane (in which the monomer or monomer mixture to be polymerized is present in dissolved form and the particulate polymer formed is present in suspended form) as the reaction medium, in the presence or absence of an antistatic agent as an antifouling agent and in the presence or absence of hydrogen as a molecular weight regulator, with circulation of the reaction mixture, the starting materials being added to the said circulation and the particulate polymer formed being removed from it. Polymerization processes of this type, ie. processes for the preparation of homopolymers and copolymers of ethylene by suspension polymerization of the monomer or monomers in a liquid alkane, are known in a variety of embodiments; in the present context, reference may be made to the procedures described in British Patents 841,263 and 1,435,965 and U.S. Pat. Nos. 3,242,150 and 4,007,321, as typical examples.

It should also be noted that the novel supported catalyst, like corresponding known catalysts, can be combined with the cocatalyst outside or inside the polymerization space; in the last-mentioned case, this may be effected, for example, by introducing the components, which may otherwise be handled in the form of a suspension (catalyst) or solution (cocatalyst), at separate points.

Finally, it should also be stated that the novel polymerization process is mainly suitable for the preparation of those ethene homopolymers and ethene copolymers (the latter in particular with propene, but-1-ene, hex-1-ene, 4-methylpent-1-ene or oct-1-ene) which are to have a high melt flow index and a selectively varied molecular weight distribution (ie. polymers as preferably used in, for example, the blow molding process), in particular good productivity, ie. a high yield of polymer per unit weight of supported catalyst used, being achieved.

Regarding the novel supported catalyst itself, which is to be used according to the invention, the following may be stated:

It is prepared in three stages, which are denoted above and below by (1.1), (1.2) and (1.3).

In the first stage (1.1), the catalyst intermediate is prepared via four substages, which can readily be carried out by the skilled worker without difficulties. Advantageously, an apparatus is used which permits continuous, very homogeneous mixing of the particular batches under an inert protective atmosphere, such as a nitrogen atmosphere. It is also advantageous if, in the second and third substages and, in the solvent, the chromium compound is reacted with the aluminum compound, or the suspension is reacted with the phosphorus compound and the product, not abruptly but gradually, for example by initially taking one component and slowly introducing the remaining components. Finally, the evaporation process in the fourth substage should be carried out under mild conditions, for example rotary evaporators being suitable for this purpose.

In the second stage (1.2), the intermediate obtained from the first stage (1.1) is converted into the catalyst intermediate in the course of three substages These process steps, too, can be readily carried out by the skilled worker without difficulties. The apparatuses and methods which are advantageous for this purpose are those conventionally used and well known for calcining or activating Phillips supported catalysts. This means for the second substage (1.2.2) that conditions have to be chosen which ensure that some or all of the chromium is in the hexavalent state in the activated catalyst intermediate; this is not a special feature compared with the prior art.

In the third stage (1.3), the catalyst intermediate obtained from stage (1.2) is converted into the actual supported catalyst in two substages and When it is obvious to the skilled worker from EP-A-264 895 that the polymerization can be influenced, in particular the molecular weight distribution can be controlled and the melt flow index increased, by adding larger amounts of alkylboron during the polymerization, the novel special feature of the third stage (1.3) is that the catalyst intermediate (1.2) is reduced before, and independently of, the polymerization to the novel supported catalyst using relatively small amounts of alkylboron (atomic ratio of Cr in the catalyst intermediate (1.2) to boron=from 1:0.01 to 1:1, preferably from 1:0.1 to 1:1), and hence no free alkylboron as cocatalyst is metered into the polymerization reactor.

The novel supported catalyst can be stored in inert solvents in the form of a suspension or in the dry state and used for polymerizations.

Regarding the composition of the novel supported catalyst, it may be stated that in general water should as far as possible be absent during its preparation. This begins with the carrier, which should be dried in a relevant conventional manner at elevated temperatures, for example for 8 hours at 140° C. under 20 mmHg, before being used. The inert organic solvent likewise to be used ($C_5$–$C_7$-alkanes, in particular n-heptane, as well as, for example, pentanes and hexanes, including cyclohexane, are particularly suitable here) should contain less than 0.1% by weight of water. The chromium compound (chromium(III) acetylacetonate is preferred here) contains, like the aluminum compound (triisobutylaluminum is particularly suitable here but, for example, tri-n-butyl-, tri-n-propyl-, triisopropyl- and triethylaluminum are also useful), in any case contains only insignificant amounts of water. Suitable phosphorus compounds which can be used and which likewise should contain not more than 1% by weight of water, are in particular diethyl phosphite, dibutyl phosphite, diethyl phosphate, di-n-butyl phosphate and triethyl phosphate, but, for example, dimethyl phosphite, diisopropyl phosphite, diphenyl phosphite, diphenyl phosphate, trimethyl phosphate and triphenyl phosphate are also suitable.

For the reaction according to 1.3, the alkylborons, triethylboron and tri-n-butylboron are particularly noteworthy.

In the novel polymerization process, not only is a supported catalyst (1) to be used but also a cocatalyst (2) in the form of a certain alkyllithium. Specific examples of alkyllithiums which are particularly suitable here are n-butyllithium, sec-butyllithium and tert-butyllithium.

EXAMPLE

Preparation of the supported catalyst

An intermediate is prepared by a method in which first a suspension is prepared from a finely divided, porous, silicate carrier which has a particle diameter of from 50 to 150 μm, a pore volume of 1.75 $cm^3/g$ and a specific surface area of 320 $m^2/g$ (dried for 8 hours at 140° C. and under 20 mmHg) and anhydrous n-heptane under an argon atmosphere and with thorough mixing by stirring, such that there are 400 parts by weight of the organic solvent per 100 parts by weight of the carrier, then chromium(III) acetylacetonate is combined with triisobutylaluminum in n-heptane with thorough mixing by stirring at 40° C., such that there are two parts by weight of aluminum and 100 parts by weight of the solvent per part by weight of chromium and the entire mixture is kept at this stated temperature for 15 minutes, then the suspension of silicate in n-heptane is combined with first triethyl phosphate and then the chromium compound/aluminum compound suspension with thorough mixing by stirring at 20° C., such that there are one part by weight of chromium from the chromium compound and 2 parts by weight of phosphorus from the phosphorus compound per 100 parts by weight of the carrier, and the entire mixture is kept at the stated temperature for 30 minutes, and finally the suspension obtained is evaporated to dryness at not more than 80° C. under reduced pressure (down to 20 mmHg) in a rotary evaporator, to produce an intermediate The intermediate is converted into a catalyst intermediate by a procedure in which, in each case, by means of a fluidized bed, the intermediate is maintained in an anhydrous stream of nitrogen for 120 minutes at 200° C., then the intermediate is maintained in an anhydrous stream of air for 120 minutes at 600° C., and finally the intermediate is maintained in an anhydrous stream of nitrogen for 60 minutes at a temperature decreasing from 250° to 100° C. the catalyst intermediate thus obtained is cooled to room temperature and suspended at 30° C. in n-heptane, such that there are 700 parts by weight of n-heptane per 100 parts by weight of catalyst intermediate (1.2) and this suspension is reacted with a solution of 2 parts by weight of triethylboron (atomic ratio of chromium to boron=1:1) in 175 parts by weight of n-heptane, once again at 30° C., with stirring. After 30 minutes, the suspension is evaporated to dryness in a rotary evaporator at 80° C. under reduced pressure (10 mmHg).

Polymerization using the supported catalyst and the cocatalyst.

A steel autoclave having an effective volume of 1 l and equipped with a stirrer is heated to 95° C. and flushed with dry nitrogen for 10 minutes. Thereafter, 2 ml of a solution containing 10 g of n-butyllithium as cocatalyst per l of n-heptane, and 500 ml of isobutane, are introduced into the reactor, after which hydrogen is forced in until the pressure reaches 2 bar. The pressure is then increased to 40 bar by feeding in ethene and, after the introduction of 80 mg of the supported catalyst with the aid of a lock (corresponding to an atomic ratio of chromium in the supported catalyst to lithium in the cocatalyst of 1:2.5), this pressure is maintained during the polymerization. After 60 minutes at a polymerization temperature of 95±2° C., the autoclave pressure is decreased with vaporization of the isobutane and of the unconverted ethene, and the resulting polymer is removed.

Further information on the product thus obtained is given in the Table below.

COMPARATIVE EXAMPLE 1

Preparation of the supported catalyst

The procedure is identical to that of the Example, except that the reaction of the catalyst intermediate with triethylboron is dispensed with.

Polymerization

The procedure is identical to that of the Example, except that in this case, in addition to 2 ml of a solution containing 10 g of n-butyllithium per 1 of n-heptane, 2 ml of a solution containing 10 g of triethylboron per 1 of n-heptane is also introduced as a cocatalyst into the autoclave before the beginning of the polymerization (atomic ratio of chromium to boron=1:2.8, atomic ratio of chromium to lithium=1:2.5).

Further information on the product obtained here is likewise given in the Table.

COMPARATIVE EXAMPLE 2

Preparation of the supported catalyst

The procedure is identical to that of the Example, except that the reaction of the catalyst intermediate with 2.8 times the amount of triethylboron (atomic ratio of chromium to boron=1:2.8) is carried out with stirring for 30 minutes at 30° C., after which the suspension is evaporated to dryness under reduced pressure Polymerization The procedure is identical to that of the Example.
Further information on the product obtained is once again given in the Table below.

TABLE

| | Productivity[a] (g of PE/ g of cat.) | HLMI[b] g/10 min | Amount of polyethylene (%) <0.5 mm |
|---|---|---|---|
| Example | 1920 | 21.1 | 3.8 |
| Comparative Example 1 | 1900 | 25.4 | 29.9 |
| Comparative Example 2 | 950 | 19.1 | 15.3 |

[a]Grams of polymer per gram of supported catalyst (1).
[b]According to DIN 53.735 at 190° C./21.6 kp.

The products obtained in the Comparative Experiments have a similar melt flow index but substantially higher contents of fine dust and, in Comparative Example 2, substantially lower productivity than the product prepared according to the invention.

We claim:
1. A supported catalyst for Phillips catalysis comprising a carrier which is laden with chromium in the oxide form, phosphorus in the oxide form and aluminum in the oxide form, and which has been obtained by:

thoroughly mixing 100 parts by weight of a finely divided, porous silicate carrier which has a particle diameter of from 1 to 400 micrometers, a pore volume of from 0.5 to 3 cm$^3$/g, and a specific surface area of from 100 to 1,000 m$^2$/g and 150 to 500 parts by weight of an inert organic liquid to form a silicate suspension.

thoroughly mixing 5 to 100 parts by weight of an inert organic liquid, 1 part by weight of chromium from a chromium compound of the formula:

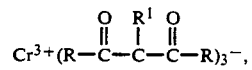

where R is alkyl of not more than 12 carbon atoms and R$^1$ is alkyl or not more than 12 carbon atoms or hydrogen, with 0.5 to 10 parts by weight of aluminum from an aluminum compound of the formula AlR$^2_3$, where R$^2$ is alkyl of not more than 12 carbon atoms, at from 0° to 100° C., to produce a chromium compound/aluminum compound suspension;

providing a phosphorus compound of the formula P(O)(OR$^3$)$_3$ or P(O)H(OR$^3$)$_2$, where R$^3$ is alkyl, aryl or cycloalkyl of not more than 12 carbon atoms or hydrogen, with the proviso that one or more groups are not hydrogen.

thoroughly mixing at from 0° to 60° C., the silicate suspension, the phosphorus compound and the chromium compound/aluminum compound suspension so that there are from 0.1 to 5 parts by weight of chromium from the chromium compound and from 0.5 to 10 parts by weight of phosphorus from the phosphorus compound per 100 parts by weight of the silicate carrier to form a catalyst suspension;

evaporating the catalyst suspension to dryness at not more than 150° C., under atmospheric or reduced pressure to produce a dry catalyst intermediate;

maintaining the dry catalyst intermediate in an anhydrous stream of nitrogen for from 60 to 500 minutes at from 150° to 300° C., then maintaining the dry catalyst intermediate in an anhydrous gas stream containing oxygen in a concentration of more than 10% by volume for from 10 to 1,000 minutes at from 300° to 900° C. to produce an oxygen-treated dry catalyst intermediate;

maintaining the oxygen-treated catalyst intermediate in an anhydrous stream of nitrogen for from 10 to 300 minutes at from 50° to 400° C. to produce a catalyst intermediate;

suspending the catalyst intermediate thus prepared in an inert organic liquid and reacting the resulting suspension with an alkylboron of the formula BR$^4_3$, where R$^4$ is C$_1$-C$_{12}$-alkyl, the atomic ratio of chromium in the catalyst intermediate to boron being from 1:0.01 to 1:1, at from −40° to 100° C. to produce a supported catalyst.

* * * * *